W. L. BLISS.
GENERATOR SUSPENSION.
APPLICATION FILED DEC. 9, 1912. RENEWED JAN. 17, 1916.
1,188,400.
Patented June 27, 1916.
2 SHEETS—SHEET 1.
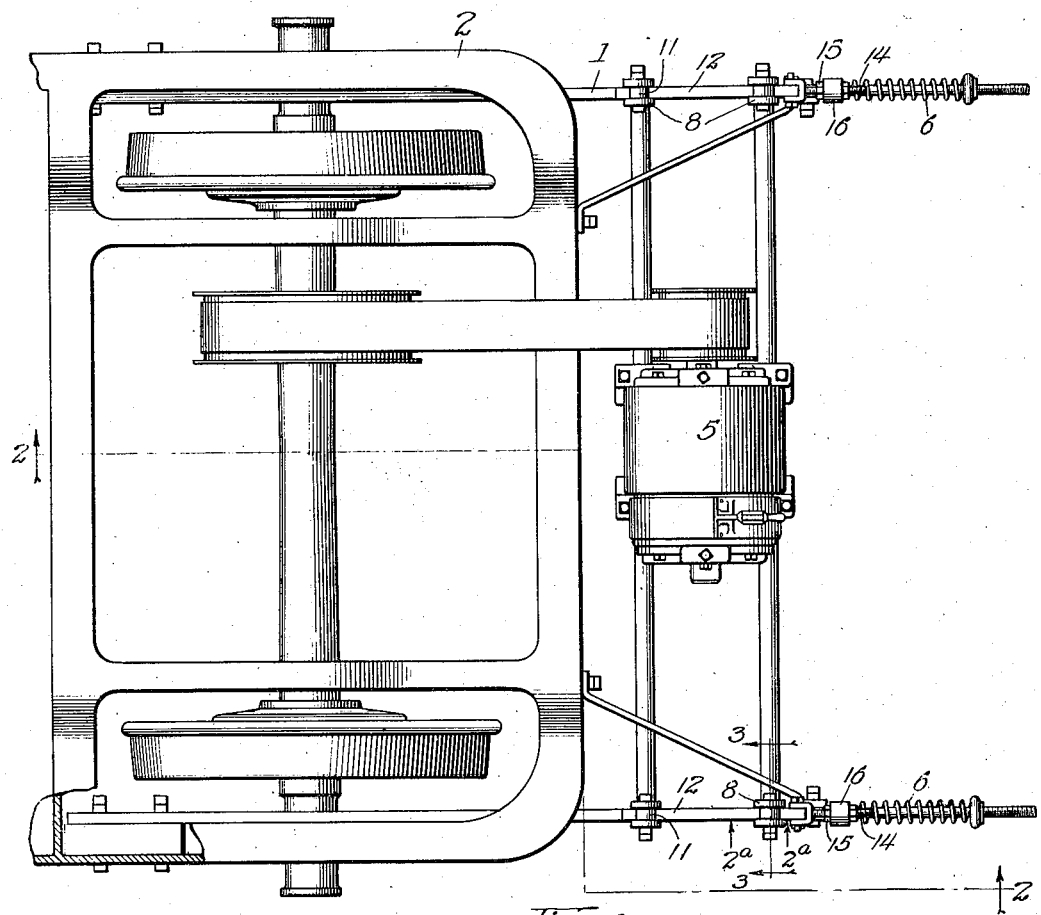
Fig. 1.
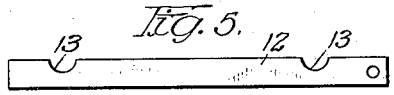
Fig. 4. Fig. 5. Fig. 6.
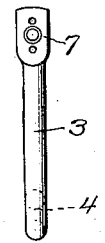
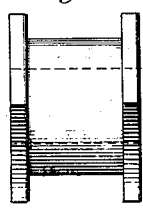
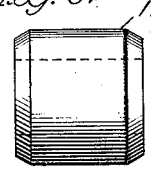
Fig. 7.
Witnesses:
R. H. Van Nest
Geo. B. Jones
Inventor:
William L. Bliss
by Edwin B. H. Tower Jr.
Atty.

W. L. BLISS.
GENERATOR SUSPENSION.
APPLICATION FILED DEC. 9, 1912. RENEWED JAN. 17, 1916.
1,188,400.
Patented June 27, 1916.
2 SHEETS—SHEET 2.
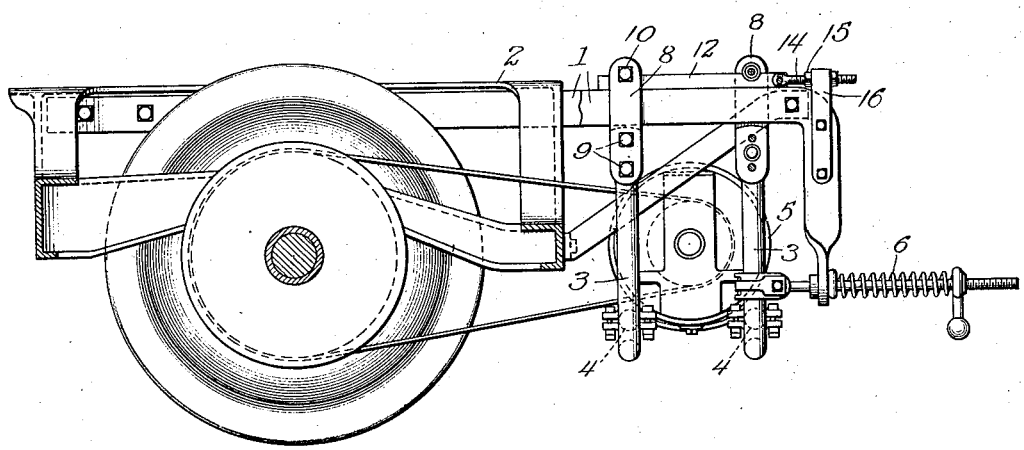
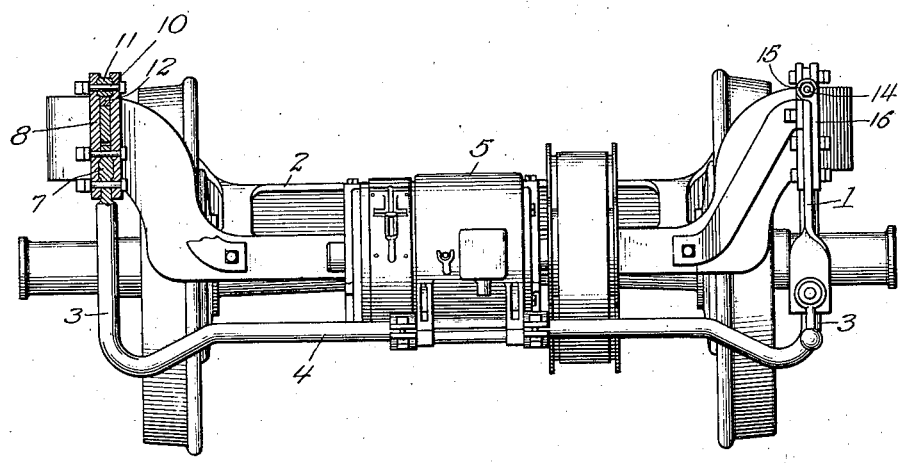

UNITED STATES PATENT OFFICE.

WILLIAM L. BLISS, OF NIAGARA FALLS, NEW YORK, ASSIGNOR, BY MESNE ASSIGNMENTS, TO U. S. LIGHT AND HEAT CORPORATION, OF NIAGARA FALLS, NEW YORK, A CORPORATION OF NEW YORK.

GENERATOR SUSPENSION.

1,188,400.  Specification of Letters Patent.  Patented June 27, 1916.

Application filed December 9, 1912, Serial No. 735,703. Renewed January 17, 1916. Serial No. 72,646.

*To all whom it may concern:*

Be it known that I, WILLIAM L. BLISS, a citizen of the United States, residing at Niagara Falls, in the county of Niagara and State of New York, have invented new and useful Improvements in Generator Suspensions, of which the following is a full, clear, concise, and exact description, reference being had to the accompanying drawing, forming a part of this specification.

My invention relates to generator suspensions.

It has for its object to provide an improved generator suspension.

A further object of my invention is to provide an improved generator suspension of the swinging link type wherein the links are supported above the side bars in such a manner as to give an increased radius of movement to the same and to increase the wearing qualities of the suspension.

Other objects and advantages of my improvement will hereinafter appear.

In order to disclose my invention clearly and fully I have illustrated one embodiment of the same in the accompanying drawings.

Figure 1 is a top plan view of a car truck equipped with a suspension. Fig. 2 is a partial sectional view on line 2—2 of Fig. 1, one of the link supports being shown in section on line 2ª—2ª of Fig. 1. Fig. 3 is an end elevation of the suspension, one of the link supports being shown in section on line 3—3 of Fig. 1. Fig. 4 is a detail view of one of the link ends. Fig. 5 is a detail view of one of the space bars. Fig. 6 is a detail view of one of the spools. Fig. 7 is a detail view of a modified form of spool.

The suspension shown is of the general type described and claimed in my co-pending application, Serial No. 491,704, filed April 23, 1909, wherein side bars 1 protruding from the ends of a truck 2 are provided with swinging depending links 3 connected by cross bars 4 carrying a generator 5, the links and generator being positioned with respect to the truck axle by means of a plurality of tension springs 6.

In this improvement instead of pivoting the links beneath the side bars, I pivot the links above the side bars. As shown, the ends of the links are flattened and provided with laterally extending integral bosses 7. If desired, these bosses, instead of being integral with the link ends, may be formed by inserting spools of hardened steel in suitable openings in the ends of the links. These bosses are received in correspondingly shaped recesses in pairs of parallel side pieces 8. These side pieces, as shown in Fig. 2, are elongated and extend from the end of the link up over the upper edge of the side bars 1 where they are supported as hereinafter described. As shown, the lower ends of the side pieces are bolted to the ends of the links by means of bolts 9 and the ends of the links have only a small clearance between the same and the lower edge of the side bars. At their upper ends they are connected by means of a bolt 10. Upon each of these bolts is carried a spool or roller 11, the ends of which are preferably seated in correspondingly shaped recesses in the inner walls of the side pieces 8. If desired the ends of these spools may be squared, as shown in Fig. 7, and received in correspondingly shaped recesses in order to lock the same more securely against rotation with respect to the side pieces. A space bar 12 is seated upon the upper edge of each suspension bar 1 beneath each of the spools 11. In order to receive these spools and permit the movement of the links, while at the same time accurately positioning them, these space bars are each provided with a pair of dished bearings 13. Each of these space bars is adjustable longitudinally of the top suspension bar and is provided at its outer end with a pivoted adjusting bolt 14 extending through and adjustably attached to, by nuts 15, an upwardly extending standard 16 fixed to the depending end of the suspension bar.

With this construction it is evident that the normal strain of supporting a generator is not carried by the bolts 9 and 10, but is entirely borne by the bosses 7 and the spools 11. The normal function of the bolts is merely to hold the side pieces together. In case of breakage of the bosses or spools, however, the bolts will still be sufficient to support the generator.

When it is desired to adjust the generator toward or away from the axle it is only necessary to move the space bars 12 to the desired position upon the suspension bars by adjusting the nuts 15. When this is done the entire suspension is moved bodily toward or away from the axle since the points of suspension of the same are supported on and fixed to the space bars 12. Obviously one of these space bars may be moved independently of the other so that a skewing adjustment of the generator may be obtained. The adjustments of the generator in an arc or along the cross bars connecting the links are made in the manner described in my previously mentioned application.

It is to be noted that the radius of movement of the links extends from the rollers 11 to the lower ends of the links and is thus materially longer than that obtainable in those suspensions wherein the links are pivoted beneath the suspension bars. It is further to be noted that inasmuch as the links are rigidly fixed to the side pieces there is no wear upon the end of the links or a supporting bearing located beneath the side bars. In this construction the wear is all taken by the spools or rollers 11. These spools are further so positioned that any evidences of wear upon the same may be readily detected and are at all times readily accessible so that they may be turned or replaced when desired. Even should these spools or rollers wear completely through, however, the suspension could not drop as it would be still supported by the bolts 10.

It is further to be noted that upon any upward movement of the suspension the spools 11 are prevented from jumping out of the bearings in the space bars 12 by reason of the fact that the clearance between the top of the links and the underside of the side bars is less than the depth of the bearings in the space bars.

While I have described one embodiment of my invention in this application, it is, of course, to be understood that the embodiment shown herein is susceptible of modification without departing from the spirit of my invention.

What I claim as new and desire to secure by Letters Patent is:

1. In a generator suspension, a suspension bar and a depending link pivotally supported above the same the pivotal support for said link including a removable bearing spool.

2. In a generator suspension, suspension bars, side pieces pivotally supported above said bars, and depending links rigidly attached to said side pieces.

3. In a generator suspension, suspension bars, a pair of side pieces pivotally supported above the same and depending therefrom, and a pair of depending links rigidly secured to said side pieces.

4. In a generator suspension, a pair of parallel suspension bars, a plurality of side pieces depending therefrom bearing spools extending between the upper ends of said side pieces, and depending links rigidly secured to the depending ends of said side pieces.

5. In a generator suspension, a pair of suspension bars, a plurality of side pieces supported by each of said side bars and depending therefrom, bearing spools carried between each pair of said side pieces, an adjustable bearing for said spools carried upon each of said side bars, and depending pivoted links rigidly secured to the depending ends of said side pieces.

6. In a generator suspension, a pair of parallel suspension bars, a plurality of side pieces depending therefrom, bearing spools extending between the upper ends of said side pieces, bearing members for said spools spacing said side pieces apart, depending links rigidly secured to the depending ends of said side pieces, and means operable from the ends of said suspension bars for adjusting said bearing members and links.

7. In a generator suspension, a pair of parallel suspension bars, a pair of spacing bars each having a plurality of bearings formed therein, said spacing bars being carried upon said suspension bars, a pair of side pieces carried by each suspension bar, a rotatable member between each of said side pieces, said rotatable members being seated in said bearings, and a pair of depending links rigidly connected to the depending ends of said side pieces.

8. In a generator suspension, a pair of parallel suspension bars, a pair of spacing bars each having a plurality of bearings formed therein, said spacing bars being carried upon said suspension bars, a pair of side pieces carried by each suspension bar, a rotatable member between each of said side pieces, said rotatable members being seated in said bearings, and a pair of depending links rigidly secured to the depending ends of said side pieces, said links being freely movable with said side pieces about their pivots but having their upper ends in close proximity to the lower edges of said suspension bars.

9. A generator suspension including a suspension bar and a depending member for supporting a generator, said member being pivotally supported from said bar, the means for supporting said depending member including a pair of spaced side pieces and a removable spool with ends supported in said side pieces.

10. Means for supporting a generator from a car truck, said means including a pair of supporting bars and generator supporting members having pivotal points above said bars, the means for pivotally supporting said members including side pieces on opposite sides of said bars, bearing spools supported in said side pieces, and means for holding said spools in position in said side pieces.

11. In a generator suspension, a pair of suspension bars, a pair of depending generator supporting slings, each including links and a connecting cross-bar, said slings being pivotally supported from points above said suspension bars, the pivoting means for said slings including a pair of side pieces for each link of each sling, the pieces of each pair being on opposite sides of the corresponding suspension bar, removable bearing spools supported in said side pieces above said suspension bars, bosses on opposite sides of the ends of said links, said bosses being supported in recesses in said side pieces below said suspension bars, and means for holding the side pieces of each pair together to hold said spools and bosses in engagement therewith.

In witness whereof, I have hereunto subscribed my name in the presence of two witnesses.

WILLIAM L. BLISS.

Witnesses:
E. P. HANNIG,
C. E. MEAD.